(12) United States Patent
Zhang et al.

(10) Patent No.: US 11,196,115 B2
(45) Date of Patent: Dec. 7, 2021

(54) CAP PLATE AND SECONDARY BATTERY

(71) Applicant: CONTEMPORARY AMPEREX TECHNOLOGY CO., LIMITED, Ningde (CN)

(72) Inventors: Jie Zhang, Ningde (CN); Zhijun Guo, Ningde (CN); Zhiyi You, Ningde (CN); Peng Wang, Ningde (CN); Guowei Li, Ningde (CN); Taosheng Zhu, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 160 days.

(21) Appl. No.: 15/976,638

(22) Filed: May 10, 2018

(65) Prior Publication Data

US 2019/0237712 A1 Aug. 1, 2019

(30) Foreign Application Priority Data

Jan. 31, 2018 (CN) .......................... 201820170296.5

(51) Int. Cl.
*H01M 2/04* (2006.01)
*H01M 2/02* (2006.01)
(Continued)

(52) U.S. Cl.
CPC ......... *H01M 50/15* (2021.01); *H01M 50/116* (2021.01); *H01M 50/147* (2021.01); *B65D 2543/00546* (2013.01)

(58) Field of Classification Search
CPC ...... H01M 2/028; H01M 2/04; H01M 2/0473; B65D 2543/00546
See application file for complete search history.

(56) References Cited

U.S. PATENT DOCUMENTS 4,034,889 A * 7/1977 Hammes ............ B65D 43/0212
220/324
6,461,765 B1 * 10/2002 Witzigreuter ....... H01M 2/0207
429/175
(Continued)

FOREIGN PATENT DOCUMENTS

CN 203377273 U 1/2014
CN 206210851 U 5/2017
(Continued)

OTHER PUBLICATIONS

Machine translation of JP 55-141073 (Year: 1980).*
Contemporary Amperex Technology Co., Limited, Extended European Search Report, EP18170610.2, Jun. 19, 2018, 6 pgs.

*Primary Examiner* — Sarah A. Slifka
*Assistant Examiner* — Rachel L Zhang
(74) *Attorney, Agent, or Firm* — Morgan, Lewis & Bockius LLP

(57) ABSTRACT

The present disclosure provides a cap plate and a secondary battery. The cap plate includes a main portion and a first protruding portion. The main portion includes a first exterior surface, a second exterior surface and a third exterior surface, the third exterior surface is a curved surface. The first protruding portion includes a fourth exterior surface extending downwardly from a bottom end of the third exterior surface, the fourth exterior surface is inclined inwardly relative to the third exterior surface. The secondary battery comprises the cap plate and a case. The case includes an opening; the cap plate is provided to the opening, the main portion is fixed to an inner wall of the case. The first protruding portion is received in the case, and a gap is provided between the fourth exterior surface and the inner wall, a dimension of the gap increases gradually along a downward direction.

6 Claims, 8 Drawing Sheets

(51) Int. Cl.
    *H01M 50/15*     (2021.01)
    *H01M 50/116*     (2021.01)
    *H01M 50/147*     (2021.01)

(56) References Cited

U.S. PATENT DOCUMENTS

| | | |
|---|---|---|
| 2003/0059670 A1* | 3/2003 | Bechtold ............ H01M 2/0202 |
| | | 429/94 |
| 2015/0053683 A1 | 2/2015 | Becklin |
| 2015/0140372 A1* | 5/2015 | Kondo ................ H01M 2/0473 |
| | | 429/56 |
| 2016/0260940 A1 | 9/2016 | Lee |
| 2017/0084887 A1 | 3/2017 | Lee et al. |

FOREIGN PATENT DOCUMENTS

| | | | | |
|---|---|---|---|---|
| JP | 55141073 A | * | 11/1980 | .......... H01M 50/147 |
| WO | WO-9946825 A1 | | 9/1999 | |
| WO | WO-2008155616 A1 | | 12/2008 | |

* cited by examiner

CAP PLATE AND SECONDARY BATTERY

CROSS-REFERENCE TO RELATED APPLICATIONS

The present application claims priority to Chinese patent application No. CN201820170296.5, filed on Jan. 31, 2018, which is incorporated herein by reference in its entirety.

FIELD OF THE PRESENT DISCLOSURE

The present disclosure relates to the field of battery, and particularly relates to a cap plate and a secondary battery.

BACKGROUND OF THE PRESENT DISCLOSURE

At present, a secondary battery generally uses a case made of aluminium alloy or plastic. In order to improve energy density of the secondary battery, people generally decreases a thickness of the case; however, if the thickness of the case is decreased, rigidity of the case will be small, which leads to an opening of the case contracting inwardly (referring to FIG. 11, shape of the contracted opening is shown by a dotted line). The rigidity of the plastic case made by injection molding is lower than the rigidity of the case made of the aluminium alloy, so the opening of the plastic case contracts inwardly more seriously under the influence of residual stress. In the process of assembling a cap plate and the case of the secondary battery, due to the contracted opening of the case, it is difficult to insert the cap plate into the case, which will increase difficulty of assembling the cap plate and the case and reduce assembling efficiency.

SUMMARY OF THE PRESENT DISCLOSURE

In view of the problem existing in the background, an object of the present disclosure is to provide a cap plate and a secondary battery, which can decrease difficulty of assembling the cap plate and the case and improve assembling efficiency.

In order to achieve the above object, in a first aspect, the present disclosure provides a cap plate, which includes a main portion and a first protruding portion. The main portion includes a first exterior surface, a second exterior surface and a third exterior surface which are formed along a periphery of the main portion, the third exterior surface is a curved surface and connects the first exterior surface and the second exterior surface. The first protruding portion is provided below the main portion and includes a fourth exterior surface extending downwardly from a bottom end of the third exterior surface, the fourth exterior surface is inclined inwardly relative to the third exterior surface.

In order to achieve the above object, in a second aspect, the present disclosure provides a secondary battery, which comprises the cap plate according to the first aspect of the present disclosure and a case. The case includes an opening in a top thereof, a shape of the opening is fitted with a shape of the periphery of the main portion; the cap plate is provided to the opening of the case, and the main portion of the cap plate is fixed to an inner wall of the case. The first protruding portion of the cap plate is received in the case, and a gap is provided between the fourth exterior surface of the first protruding portion and the inner wall of the case, a dimension of the gap increases gradually along a downward direction.

The present disclosure has the following beneficial effects: in the process of assembling the case and the cap plate, because the fourth exterior surface is inclined inwardly relative to the third exterior surface, even though the opening of the case contracts, the first protruding portion also can be inserted into the opening. After inserting the first protruding portion into the opening, the fourth exterior surface of the first protruding portion contacts the inner wall of the case; with a downward movement of the cap plate, the fourth exterior surface will apply an outward force to the inner wall of the case, the inner wall will be stretched outwardly gradually under the influence of the outward force, and the opening of the case will be expended gradually; when the first protruding portion has been inserted into the case completely, the opening of the case can be completely expanded by the first protruding portion, when the cap plate is continuously moved downwardly, the main portion of the cap plate can be allowed to directly insert into the opening. Therefore, the secondary battery of the present disclosure can reduce difficulty of assembling the cap plate and the case, improve assembling efficiency.

Figure 1:
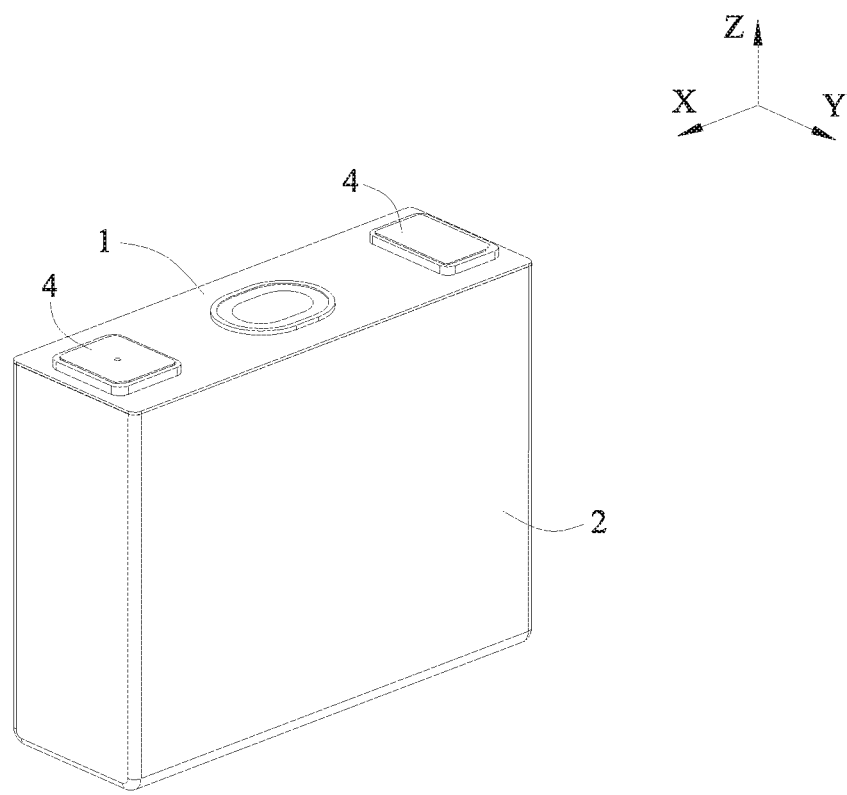
FIG. 1 is a schematic view of a secondary battery according to the present disclosure.

Reference numerals in figures are represented as follows:
1 cap plate
  11 main portion
    111 first exterior surface
    112 second exterior surface
    113 third exterior surface
    114 groove
  12 first protruding portion
    121 fourth exterior surface 13 second protruding portion
   131 fifth exterior surface
14 third protruding portion
2 case
   21 inner wall
   22 top surface
3 electrode assembly
4 electrode terminal
L1 axis
L2 first generatrix
L3 second generatrix
X transverse direction
Y longitudinal direction
Z up-down direction

DETAILED DESCRIPTION

Hereinafter a cap plate and a secondary battery according to the present disclosure will be described in detail in combination with the figures.

Firstly, a cap plate according to a first aspect of the present disclosure will be described.

Referring to FIGS. 1-14, a cap plate 1 according to the present disclosure includes a main portion 11 and a first protruding portion 12. The main portion 11 includes a first exterior surface 111, a second exterior surface 112 and a third exterior surface 113 which are formed along a periphery of the main portion 11, the third exterior surface 113 is a curved surface and connects the first exterior surface 111 and the second exterior surface 112. The first protruding portion 12 is provided below the main portion 11 and includes a fourth exterior surface 121 extending downwardly from a bottom end of the third exterior surface 113, the fourth exterior surface 121 is inclined inwardly relative to the third exterior surface 113.

Preferably, the third exterior surface 113 is a curved surface parallel to an up-down direction Z. Specifically, referring to FIG. 14, the third exterior surface 113 can be generated by a first generatrix L2 rotating around an axis L1, the first generatrix L2 and the axis L1 are parallel to the up-down direction Z. Preferably, the first generatrix L2 rotates around the axis L1 by 90 degrees. The first exterior surface 111 and the second exterior surface 112 are planes parallel to the up-down direction Z. Furthermore, the third exterior surface 113 is tangential to the first exterior surface 111 and the second exterior surface 112.

The cap plate 1 is a constituent member of a secondary battery. Specifically, the cap plate 1 is used for assembling with a case 2 of the secondary battery. The main portion 11 of the cap plate 1 can be inserted into an opening of the case 2 and fixed to an inner wall 21 of the case 2. When the main portion 11 of the cap plate 1 is inserted into the opening of the case 2, the third exterior surface 113 will be fixed to a corner of the inner wall 21.

A line generated at an intersection of the third exterior surface 113 and a plane perpendicular to the up-down direction Z is a circular arc, and a radius of the circular arc ranges from 1 mm to 10 mm. The third exterior surface 113 can be formed by providing a rounded corner in the main portion 11. In the forming process of the case 2, the corner of the inner wall 21 is configured as a rounded corner; in order to ensure sealing performance between the cap plate 1 and the case 2, the line generated at the intersection of the third exterior surface 113 and the plane perpendicular to the up-down direction Z is configured as the circular arc, and the radius of the circular arc is less than or equal to a radius of the rounded corner of the inner wall 21.

When the main portion 11 of the cap plate 1 is inserted into the case 2, the case 2 and main portion 11 can be welded together by a laser emitted from the outside of the case 2. In the process of welding the case 2 and main portion 11, when the laser moves along the third exterior surface 113, a distance between focus of the laser and the third exterior surface 113 will change along the circular arc, which will affect welding quality. Because the radius of the circular arc ranges from 1 mm to 10 mm, variation of the welding quality caused by the distance between focus of the laser and the third exterior surface 113 will be little, thereby ensuring sealing performance and strength of the welding zone.

Figure 9:
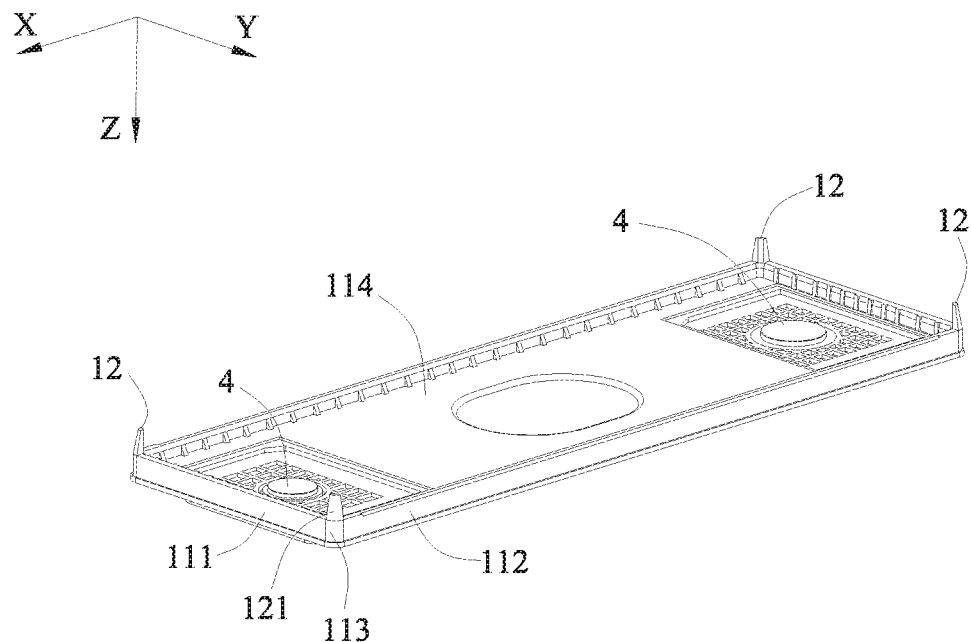
FIG. 9 is a schematic view of an embodiment of the cap plate according to the present disclosure.
Figure 10:
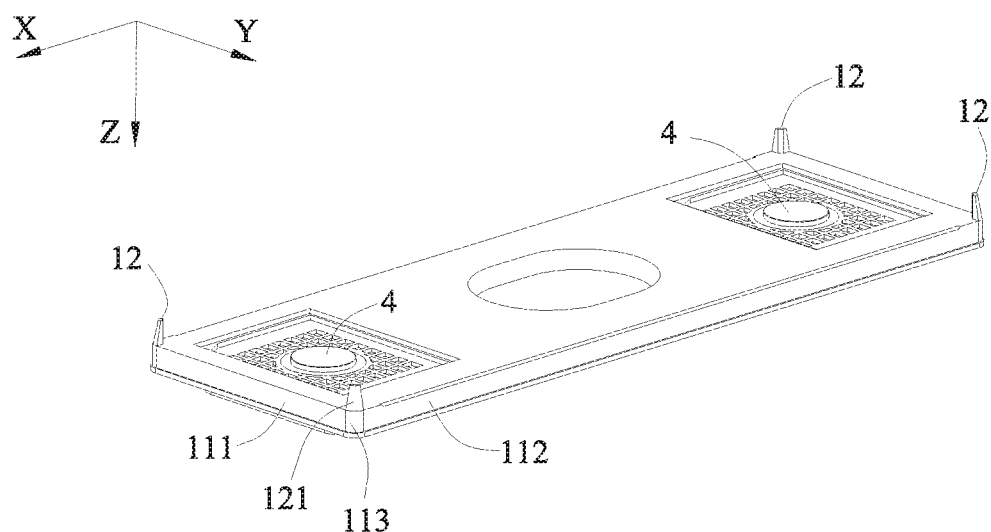
FIG. 10 is a schematic view of another embodiment of the cap plate according to the present disclosure.
Figure 14:
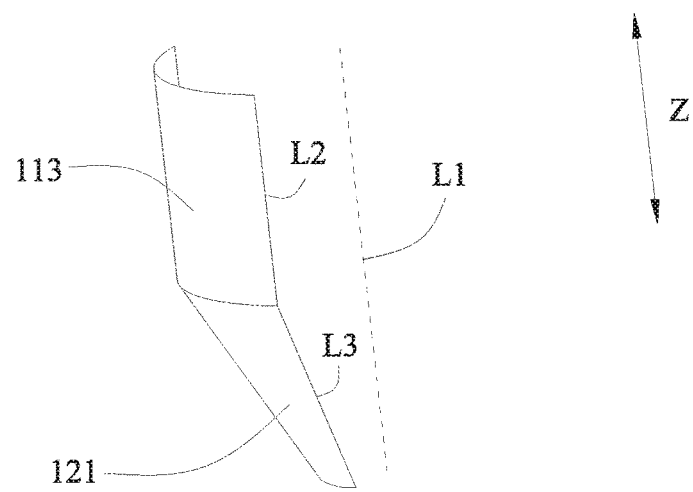
FIG. 14 is a schematic view of a third exterior surface and a fourth exterior surface of the cap plate according to the present disclosure.

Referring to FIG. 9, FIG. 10 and FIG. 14, lengths of lines respectively generated at intersections of the fourth exterior surface 121 and planes perpendicular to the up-down direction Z gradually decrease from top to bottom. In the process of inserting the first protruding portion 12 into the case 2, the fourth exterior surface 121 contacts the inner wall 21 of the case 2; with a downward movement of the first protruding portion 12, the support force of the first protruding portion 12 with respect to the case 2 will increase gradually. Because the lengths of the lines respectively generated at the intersections of the fourth exterior surface 121 and the planes perpendicular to the up-down direction Z gradually decrease from top to bottom, with the downward movement of the first protruding portion 12, a contacting area between the fourth exterior surface 121 and the inner wall 21 of the case 2 will increase gradually, thereby preventing deformation of the first protruding portion 12 caused by the excessive support force.

The lines respectively generated at the intersections of the fourth exterior surface 121 and the planes perpendicular to the up-down direction Z are circular arcs. Specifically, the fourth exterior surface 121 is generated by a second generatrix L3 rotating around the axis L1, and a top end of the second generatrix L3 is connected with a bottom end of the first generatrix L2. The second generatrix L3 is inclined inwardly relative to the first generatrix L2, in other words, the second generatrix L3 is inclined towards the axis L1, so the fourth exterior surface 121 is inclined inwardly relative to third exterior surface 113. An angle between the second generatrix L3 and the axis L1 ranges from 5 degrees to 45 degrees. Similarly, the second generatrix L3 rotates around the axis L1 by 90 degrees.

Figure 12:
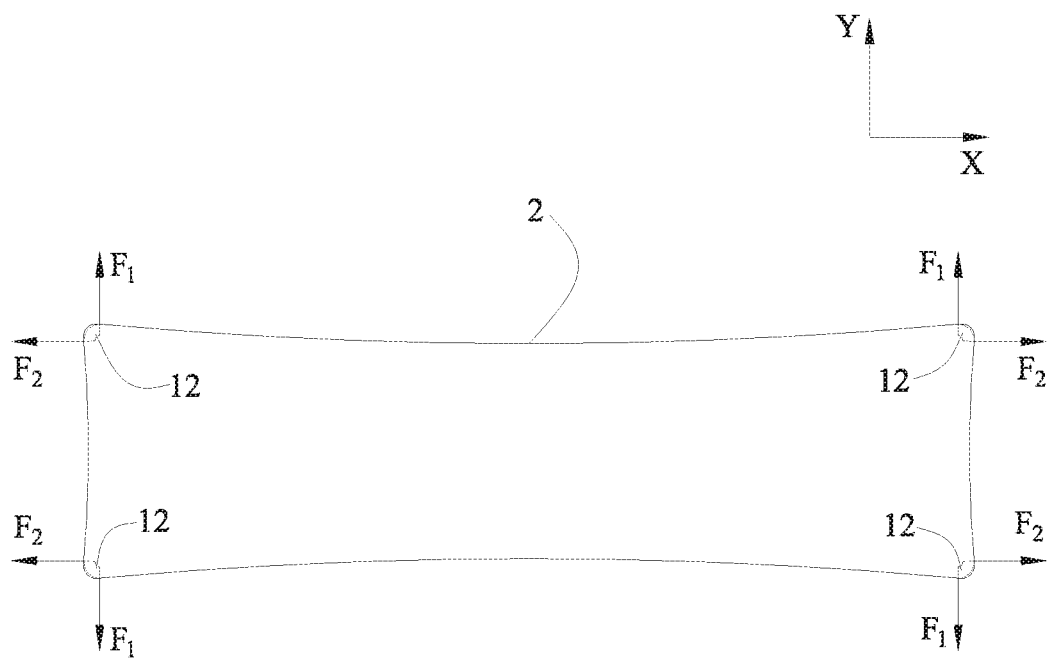
FIG. 12 is a schematic view of the opening of the case according to the present disclosure in the process of assembling with the cap plate.
Figure 13:
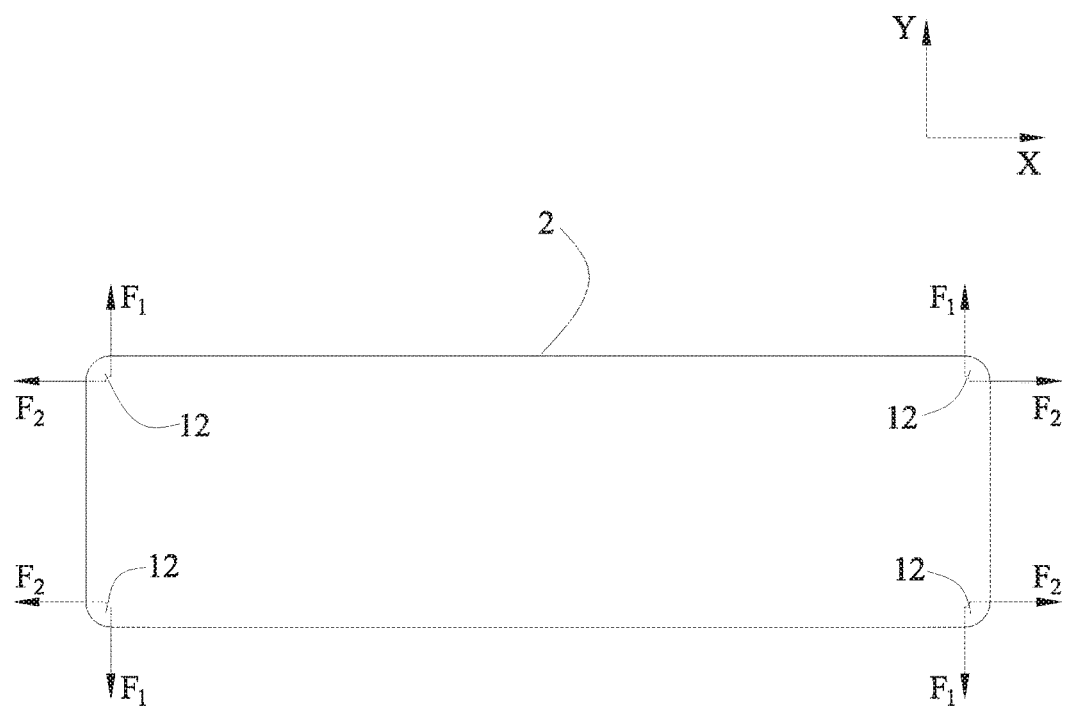
FIG. 13 is another schematic view of the opening of the case according to the present disclosure in the process of assembling with the cap plate.

The main portion 11 of the cap plate 1 may be a flat plate in shape of quadrilateral. Specifically, referring to FIG. 9 and FIG. 10, the first exterior surface 111 is provided as two in number, the second exterior surface 112 is provided as two in number, the first exterior surfaces 111 and the second exterior surfaces 112 are alternately provided along the periphery of the main portion 11, the third exterior surfaces 113 each are provided between each first exterior surface 111 and each second exterior surface 112 adjacent to the first exterior surface 111; each third exterior surface 113 is positioned at the corner of the main portion 11, the bottom end of each third exterior surface 113 is connected with one corresponding fourth exterior surface 121. In other words, the third exterior surface 113 is provided as four in number. The third exterior surface 113 may be formed by providing the rounded corner on the flat plate. Because the bottom end of each third exterior surface 113 is connected with one corresponding fourth exterior surface 121, the fourth exterior surface 121 is provided as four in number; correspondingly, the first protruding portion 12 is provided as four in number and respectively formed at four corners of the main portion 11. Preferably, the two first exterior surfaces 111 are perpendicular to a transverse direction X, and the two second exterior surfaces 112 are perpendicular to a longitudinal direction Y. Referring to FIG. 12 and FIG. 13, the four first protruding portions 12 respectively apply force to the four corners of the inner wall 21. When a first protruding portion 12 applies force to a corresponding corner of the inner wall 21, the force can be decomposed into a component $F_1$ and a component $F_2$ in two directions, which in turn can wholly expand the opening of the case 2 more easily. If the fourth exterior surface 121 of the first protruding portion 12 applies force to other position of the inner wall 21, direction of the force is single, which will easily lead to the opening of the case 2 only being partly expanded. Preferably, the number of the first protruding portions 12 is equal to the number of the corners of the inner wall 21, if the number of the first protruding portions 12 is less than the number of the corners of the inner wall 21, the opening of the case 2 will only be partly expanded, which will lead to the main portion 11 of the cap plate 1 being inserted into the opening of the case 2 difficulty.

Figure 3:
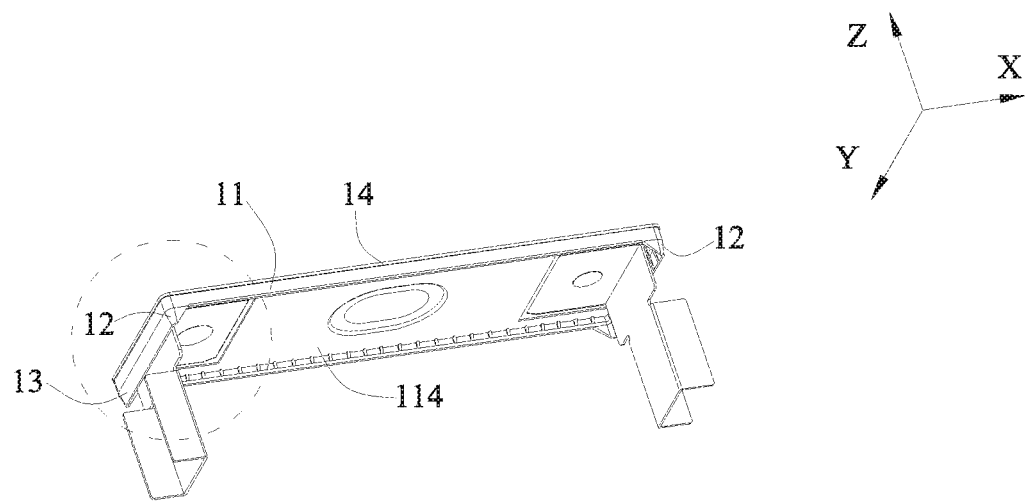
FIG. 3 is a schematic view of a cap plate of the secondary battery according to the present disclosure.
Figure 4:
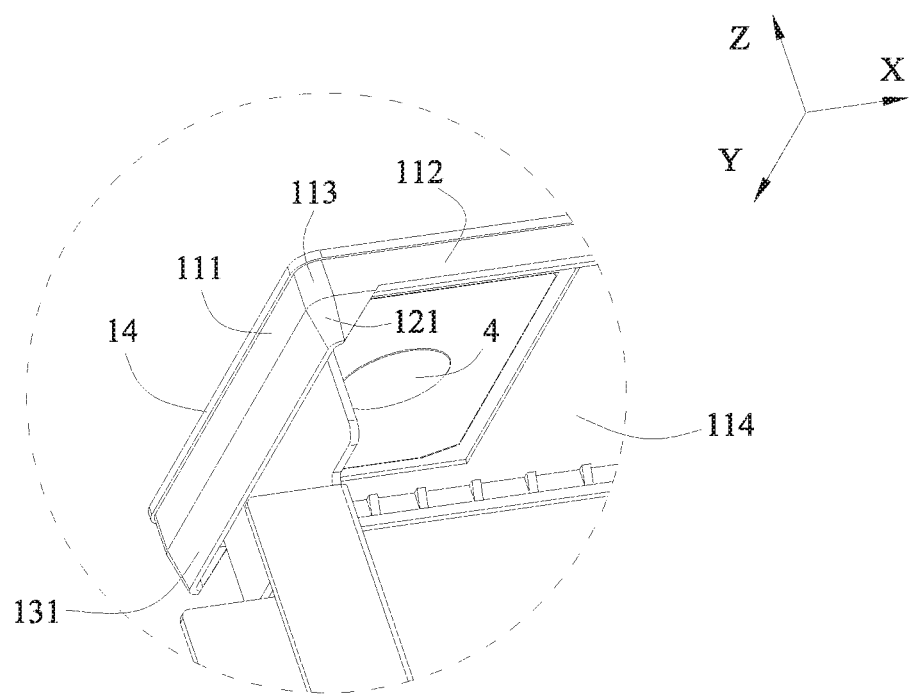
FIG. 4 is an enlarged view of a part of FIG. 3 surrounded by a dotted circle.
Figure 11:
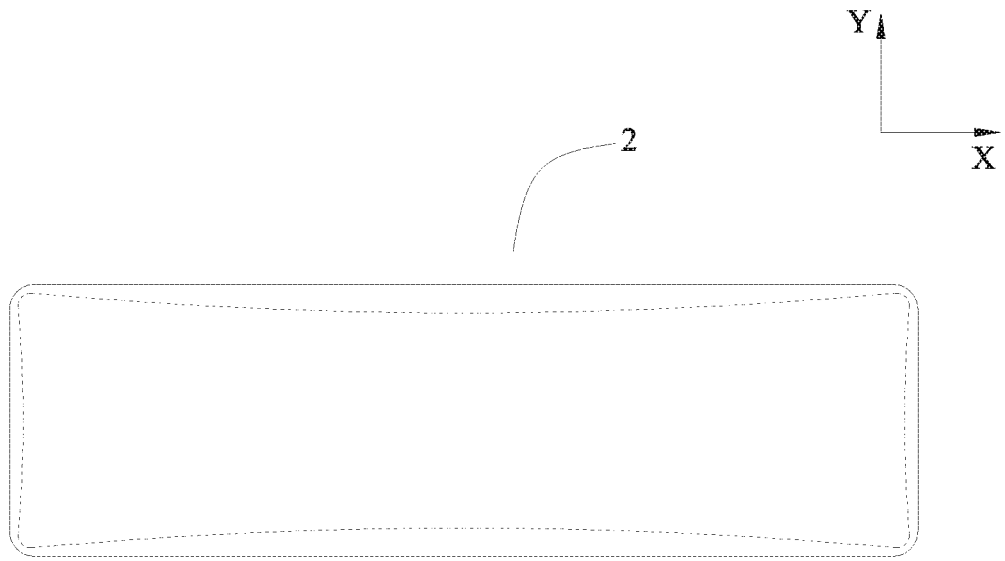
FIG. 11 is a schematic view of an opening of a case, in which the opening of the case before assembling with the cap plate is shown by a dotted line, the opening of the case after assembling with the cap plate is shown by a solid line.

Referring to FIG. 3 and FIG. 4, the cap plate 1 further includes a second protruding portion 13 provided below the main portion 11, the second protruding portion 13 includes a fifth exterior surface 131 extending downwardly from a bottom end of the first exterior surface 111, the fifth exterior surface 131 is inclined inwardly relative to the first exterior surface 111. An end of the second protruding portion 13 in the longitudinal direction Y is connected with the first protruding portion 12, and the fifth exterior surface 131 of the second protruding portion 13 is connected with the fourth exterior surface 121 of the first protruding portion 12. The fifth exterior surface 131 is a plane, a line generated at an intersection of the fifth exterior surface 131 and the fourth exterior surface 121 can be acted as the second generatrix L3. The angle between the second generatrix L3 and the axis L1 is equal to an angle between the fifth exterior surface 131 and the axis L1. Preferably, two ends of the second protruding portion 13 in the longitudinal direction Y are respectively connected with two first protruding portions 12, and the fifth exterior surface 131 of the second protruding portion 13 is connected with the fourth exterior surfaces 121 of the two first protruding portions 12. A length of the first exterior surface 111 is smaller than a length of the second exterior surface 112. Referring to FIG. 11, in the process of placement of the case 2 lonely, a long wall of the case 2 extending in the transverse direction X generally deforms inwardly more than a short wall of the case 2 extending in the longitudinal direction Y; referring to FIG. 12, in the process of inserting the first protruding portion 12 into the case 2, the long wall of the case 2 needs to be stretched to a large extent, so a force (which is a reaction with respect to the component $F_2$ shown in FIG. 12) in the transverse direction X applied to the first protruding portion 12 is large; a part of the force in the transverse direction X can be applied to the second protruding portion 13, which can effectively prevent deformation of the first protruding portion 12.

Referring to FIG. 9, a groove 114 recessed upwardly is provided in a bottom surface of the main portion 11. The groove 114 can reduce weight of the cap plate 1, save interior space of the secondary battery, thereby improving energy density. An inner peripheral wall of the groove 114 can be provided with ribbed plates, which can improve strength of the cap plate 1. Alternatively, referring to FIG. 10, the main portion 11 also can be a solid structure.

Figure 2:
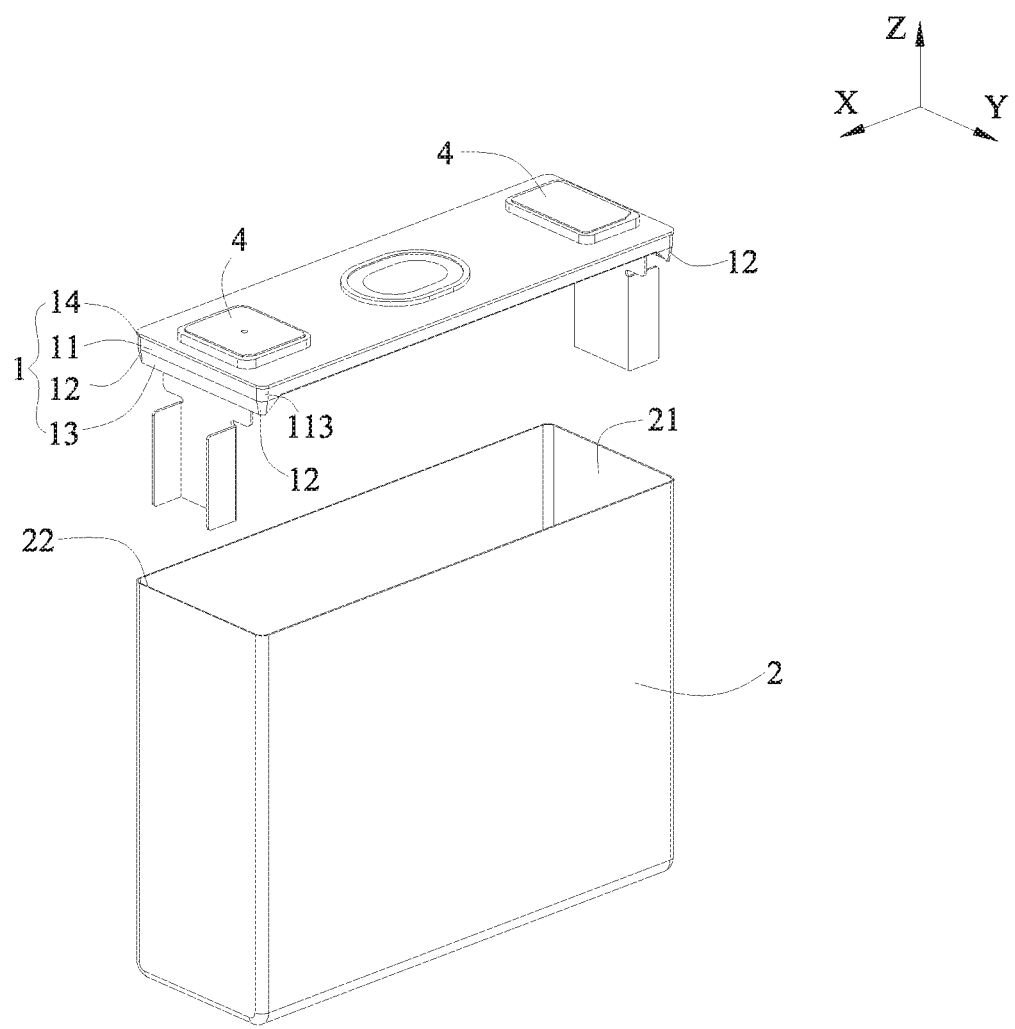
FIG. 2 is an exploded view of the secondary battery according to the present disclosure in which an electrode assembly is not shown.

Referring to FIGS. 2-4, the cap plate 1 further includes a third protruding portion 14 provided to the main portion 11 and protruding outwardly. The third protruding portion 14 extends outwardly from the first exterior surfaces 111, the second exterior surfaces 112 and the third exterior surfaces 113. Preferably, the periphery of the main portion 11 is encircled by the third protruding portion 14. Alternatively, the third protruding portion 14 also can only extend outwardly from the first exterior surfaces 111. In the prior art, the inner wall 21 of the case 2 is generally provided with a step, the step is used to prevent the cap plate 1 being excessively inserted into the case 2; compared to the step of the prior art, the third protruding portion 14 provided to the periphery of the main portion 11 not only can prevent the cap plate 1 being excessively inserted into the case 2, but also further decrease a thickness of the case 2 and improve the energy density of the secondary battery.

The cap plate 1 can be made of plastic. Compared to the cap plate 1 made of aluminium alloy, forming method of the cap plate 1 made of the plastic is simple and weight of the plastic is small.

Secondly, a secondary battery according to a second aspect of the present disclosure will be described.

Referring to FIGS. 1-14, a secondary battery according to the present disclosure comprises the cap plate 1 according to the first aspect of the present disclosure and the case 2. Both the cap plate 1 and the case 2 are made of plastic, the plastics used for making the cap plate 1 and the case 2 can be same or different. The case 2 includes the opening in a top thereof, a shape of the opening is fitted with a shape of the periphery of the main portion 11; the cap plate 1 is provided to the opening of the case 2, and the main portion 11 of the cap plate 1 is fixed to the inner wall 21 of the case 2, the third exterior surface 113 is fixed to the corner of the inner wall 21. The first protruding portion 12 of the cap plate 1 is received in the case 2, and a gap is provided between the fourth exterior surface 121 of the first protruding portion 12 and the inner wall 21 of the case 2, a dimension of the gap increases gradually along a downward direction.

Preferably, the corner of the inner wall 21 is configured as the rounded corner.

Figure 5:
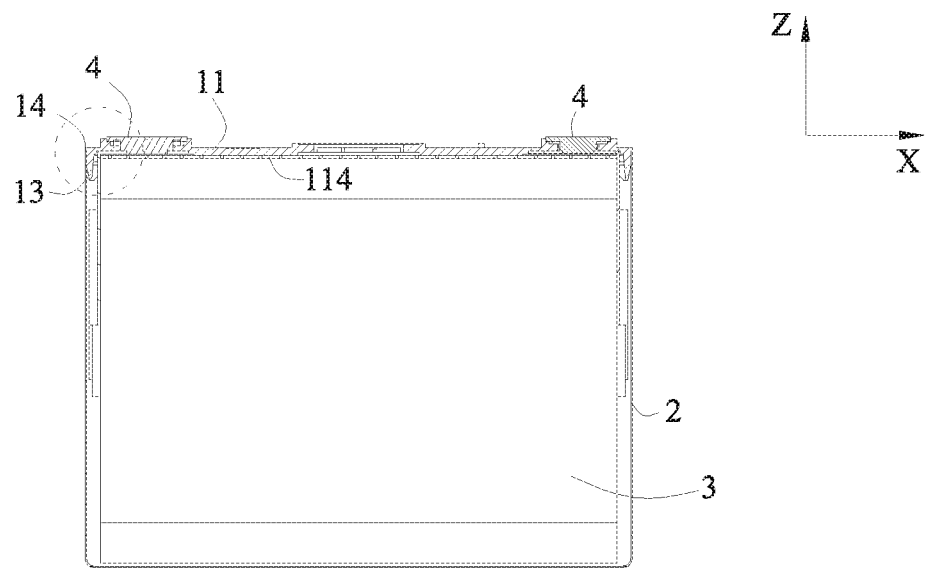
FIG. 5 is a cross sectional view of the secondary battery according to the present disclosure.
Figure 7:
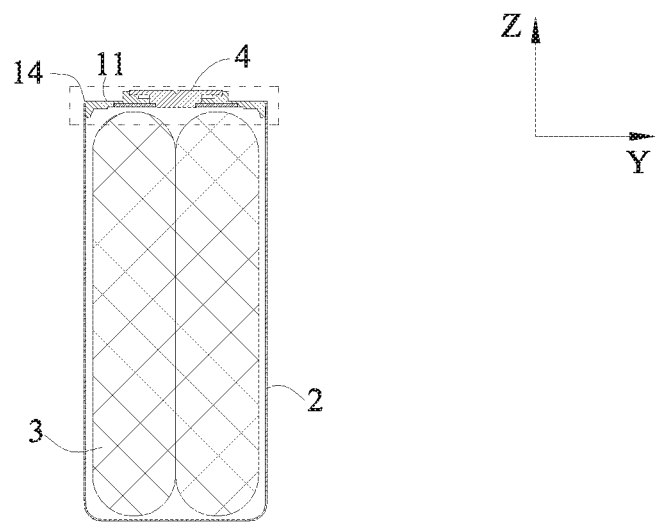
FIG. 7 is another cross sectional view of the secondary battery according to the present disclosure.

Referring to FIG. 5 and FIG. 7, the secondary battery further comprises an electrode assembly 3 and an electrode terminal 4, the electrode assembly 3 is received in the case 2, the electrode terminal 4 is fixed to the main portion 11 of the cap plate 1 and electrically connected with the electrode assembly 3. The electrode assembly 3 comprises a positive electrode plate, a negative electrode plate and a separator separating the positive electrode plate and the negative electrode plate.

Because the case 2 is thin and made of plastic, referring to a dotted line shown in FIG. 11, the opening of the case 2 will contract inwardly under the influence of residual stress, which leads to a dimension of the opening being smaller than a dimension of the main portion 11 of the cap plate 1.

In the process of assembling the case 2 and the cap plate 1, the first protruding portion 12 needs to be inserted into the corner of the inner wall 21 firstly. Because the fourth exterior surface 121 is inclined inwardly relative to the third exterior surface 113, the fourth exterior surface 121 is offset inwardly from top to bottom; even though the opening of the case 2 contracts, the first protruding portion 12 also can be inserted into the opening. Referring to FIG. 12, after inserting the first protruding portion 12 into the opening, the fourth exterior surface 121 of the first protruding portion 12 contacts the inner wall 21 of the case 2; with a downward movement of the cap plate 1, the fourth exterior surface 121 will apply an outward force (such as the component $F_1$ and the component $F_2$ shown in FIG. 12) to the inner wall 21 of the case 2, the inner wall 21 will be stretched outwardly gradually under the influence of the outward force, and the opening of the case 2 will be expended gradually; referring to FIG. 13, when the first protruding portion 12 has been inserted into the case 2 completely, the opening of the case 2 can be completely expanded by the first protruding portion 12, when the cap plate 1 is continuously moved downwardly, the main portion 11 of the cap plate 1 can be allowed to directly insert into the opening. Therefore, the secondary battery of the present disclosure can reduce difficulty of assembling the cap plate 1 and the case 2, improve assembling efficiency.

Referring to FIG. 12 and FIG. 13, the first protruding portion 12 is identical with the corner of the inner wall 21 of the case 2 in number. When the first protruding portion 12 applies force to the corner of the inner wall 21, the force can be decomposed into the component F1 and the component F2 in two directions, which can wholly expand the opening of the case 2 more easily. If the fourth exterior surface 121 of the first protruding portion 12 applies force to other position of the inner wall 21, the direction of the force is single, which will easily lead to the opening of the case 2 only being partly expanded. In addition, the number of the first protruding portions 12 needs to be equal to the number of the corners of the inner wall 21, if the number of the first protruding portions 12 is less than the number of the corners of the inner wall 21, the opening of the case 2 will be partly expanded, which will lead to the main portion 11 of the cap plate 1 being inserted into the opening of the case 2 difficulty. The second protruding portion 13 of the cap plate 1 can improve the strength of the first protruding portion 12 and help expand the opening of the case 2.

Preferably, lengths of the lines respectively generated at the intersections of the fourth exterior surface 121 and the planes perpendicular to the up-down direction Z gradually decrease from top to bottom, so the first protruding portion 12 can be inserted into the case 2 easily. Furthermore, in the process of inserting the first protruding portion 12 into the case 2, the fourth exterior surface 121 contacts the inner wall 21 of the case 2; with the downward movement of the first protruding portion 12, the support force of the first protruding portion 12 with respect to the case 2 will increase gradually. Because the lengths of the lines respectively generated at the intersections of the fourth exterior surface 121 and the planes perpendicular to the up-down direction Z gradually decrease from top to bottom, with the downward movement of the first protruding portion 12, the contacting area between the fourth exterior surface 121 and the inner wall 21 of the case 2 will increase gradually, thereby preventing deformation of the first protruding portion 12 caused by the excessive support force.

Preferably, the angle between the second generatrix L3 and the axis L1 ranges from 5 degrees to 45 degrees. If a length of the first protruding portion 12 extending in the up-down direction Z is constant, with increasing of the angle, the length of the second generatrix L3, an area of the fourth exterior surface 121 and a volume of the first protruding portion 12 will increase correspondingly; if the angle is larger than 45 degrees, the first protruding portion 12 will occupy excessive space, which reduces the energy density of the secondary battery. In addition, in the process of assembling the cap plate 1 and the case 2, if the angle is too large, the first protruding portion 12 may damage the electrode assembly 3, thereby leading to short circuit; when the cap plate 1 moves a unit distance downwardly, if the angle is too large, the opening of the case 2 will deform excessively, which damages the case 2 easily. In addition, if the angle is too small, the first protruding portion 12 cannot be easily inserted into the opening of the case 2, which leads to difficulty of assembling.

Figure 6:
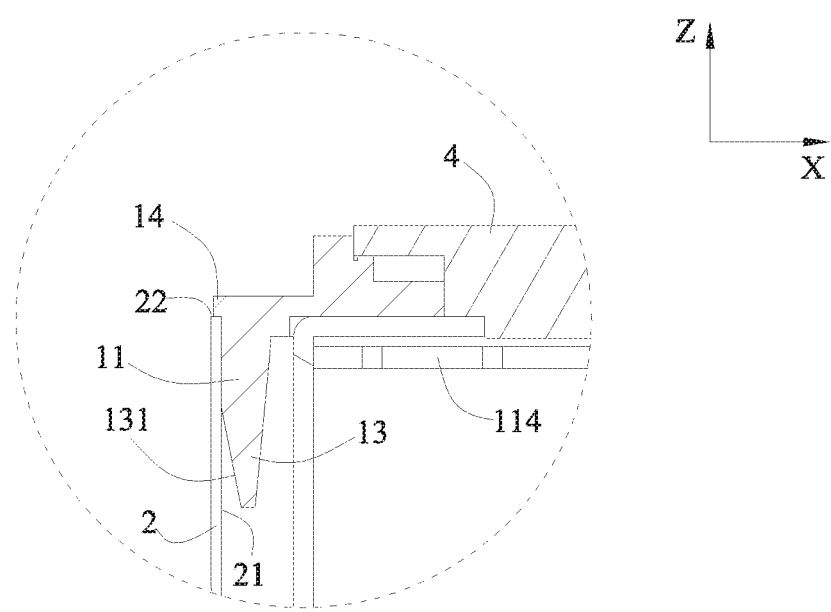
FIG. 6 is an enlarged view of a part of FIG. 5 surrounded by a dotted circle.
Figure 8:
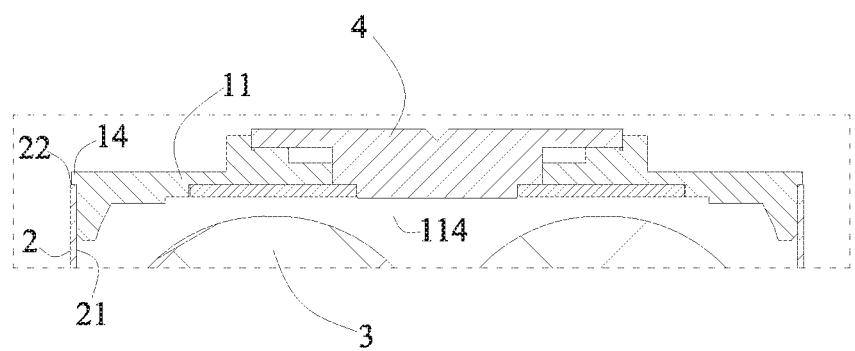
FIG. 8 is an enlarged view of a part of FIG. 7 surrounded by a dotted circle.

Referring to FIG. 6 and FIG. 8, the third protruding portion 14 is attached to a top surface 22 of the case 2. The third protruding portion 14 can have a positioning function in the assembling process, prevent the main portion 11 of the cap plate 1 from inserting the case 2 excessively.

There is an interference fit between the main portion 11 of the cap plate 1 and the inner wall 21 of the case 2. The interference fit can ensure that there is no space between the main portion 11 and the inner wall 21 of the case 2, and improve sealing performance. In addition, the opening of the case 2 can be expanded by the first protruding portion 12, so the interference fit will not increase difficulty of assembling.

The first exterior surfaces 111, the second exterior surfaces 112 and the third exterior surfaces 113 of the main portion 11 of the cap plate 1 can be fixed to the inner wall 21 of the case 2 by laser welding, and a height of welding zone between the main portion 11 and the case 2 in the up-down direction Z ranges from 0.5 mm to 10 mm. When the main portion 11 is inserted into the case 2, the case 2 and main portion 11 can be welded together by the laser emitted from the outside of the case 2. For the cap plate 1 made of plastic and the case 2 made of plastic, the prior art generally melt an edge of the case 2 and an edge of the cap plate 1 by a hot plate, and then securely connects the edge of the case 2 and the edge of the cap plate 1 under exterior pressure; however, when the hot plate are separated from the case 2 or the cap plate 1, the plastic will easily generate filaments due to adhering to the hot plate, and the filaments will enter the case 2 easily and pierce the separator, which leads to short circuit of the electrode assembly 3; at the same time, with this connecting way in the prior art, connecting area, connecting strength and sealing performance between the case 2 and the cap plate 1 are not desirable. The welding way of the present disclosure will not generate filaments in the case 2, which can ensure the sealing performance and no foreign matter existing in the case 2.

The case 2 is made of plastic and a wall thickness of the case 2 ranges from 0.1 mm to 0.6 mm. The prior art generally securely connects the case 2 made of metal and the cap plate 1 made of metal by butt welding, in order to ensure welding strength, a gap between the case 2 and cap plate 1 must be small. In the present disclosure, the case 2 is made of plastic and the wall thickness is small, and the opening of the case 2 will contract inwardly easily under the influence of the residual stress after injection molding, so the case 2 cannot be attached to the cap plate 1 closely, which may lead to low welding strength or weak welding; in addition, if the case 2 made of plastic and the cap plate 1 made of plastic are connected by butt welding, it will lead to a small welding area and cannot ensure welding strength. By welding the periphery of the main portion 11 of the cap plate 1 (specifically, the first exterior surface 111, the second exterior surface 112 and the third exterior surface 113) to the case 2 and ensuring that the height of welding zone between the periphery of the main portion 11 of the cap plate 1 and the case 2 in the up-down direction Z ranges from 0.5 mm to 10 mm, it can increase connecting area, prevent low welding strength and weak welding.

Preferably, the groove 114 recessed upwardly is provided in the bottom surface of the main portion 11. The groove 114 can increase interior space of the secondary battery and improves energy density.

The line generated at the intersection of the third exterior surface 113 and the plane perpendicular to the up-down direction Z is the circular arc, and the radius of the circular arc ranges from 1 mm to 10 mm. In the process of laser welding, when the laser moves along the third exterior surface 113, the distance between the focus of the laser and the third exterior surface 113 will change along the circular arc, which leads to the focus of the laser offsetting from the welding zone and variation of welding quality. However, if the radius of the circular arc can be controlled between 1 mm and 10 mm, the variation of the welding quality caused by the circular arc will not influences the sealing performance and strength of laser welding.

What is claimed:

1. A secondary battery, wherein
the secondary battery comprises a cap plate and a case;
the cap plate includes a main portion and a first protruding portion;
the main portion includes a first exterior surface, a second exterior surface and a third exterior surface which are formed along a periphery of the main portion, the third exterior surface is a curved surface and connects the first exterior surface and the second exterior surface;
the first exterior surface is provided as two in number, the second exterior surface is provided as two in number, the first exterior surfaces and the second exterior surfaces are alternately provided along the periphery of the main portion, the third exterior surfaces is provided as four in number, the third exterior surfaces each are provided between each first exterior surface and each second exterior surface adjacent to the first exterior surface;
the first protruding portion is provided as four in number and positioned below the main portion, and each first protruding portion includes a fourth exterior surface extending downwardly from a bottom end of one corresponding third exterior surface, each fourth exterior surface is inclined inwardly relative to the one corresponding third exterior surface;
the case includes an opening in a top thereof, a shape of the opening is fitted with a shape of the periphery of the main portion;
the cap plate is provided to the opening of the case, and the main portion of the cap plate is fixed to an inner wall of the case;
the first protruding portion of the cap plate is received in the case, and a gap is provided between the fourth exterior surface and the inner wall of the case, a dimension of the gap increases gradually along a downward direction;
the cap plate further comprises a third protruding portion provided to the main portion, and the third protruding portion is directly attached on a top surface of the case;
the third protruding portion extends outwardly from the first exterior surfaces, the second exterior surfaces and the third exterior surfaces, and the periphery of the main portion is encircled by the third protruding portion; and
the case is made of plastic,
there is an interference fit between a periphery of the main portion defined by the first exterior surfaces, the second exterior surfaces and the third exterior surfaces of the main portion of the cap plate and the inner wall of the case whereby the opening of the case is expanded when the first protruding portion of the cap plate is received in the case.

2. The secondary battery according to claim 1, wherein the first exterior surfaces, the second exterior surfaces and the third exterior surfaces of the main portion of the cap plate are fixed to the inner wall of the case by laser welding.

3. The secondary battery according to claim 1, wherein lengths of lines respectively generated at intersections of the fourth exterior surface and planes perpendicular to an up-down direction gradually decrease from top to bottom.

4. The secondary battery according to claim 3, wherein the lines are circular arcs.

5. The secondary battery according to claim 1, wherein the fourth exterior surface is generated by a second generatrix rotating around an axis, and the axis is parallel to an up-down direction, an angle between the second generatrix and the axis ranges from 5 degrees to 45 degrees.

6. The secondary battery according to claim 1, wherein the cap plate further includes a second protruding portion provided below the main portion, the second protruding portion includes a fifth exterior surface extending downwardly from a bottom end of the first exterior surface, the fifth exterior surface is inclined inwardly relative to the first exterior surface;
an end of the second protruding portion is connected with the first protruding portion, and the fifth exterior surface of the second protruding portion is connected with the fourth exterior surface of the first protruding portion.

* * * * *